US011574139B2

(12) United States Patent
Zhang et al.

(10) Patent No.: US 11,574,139 B2
(45) Date of Patent: Feb. 7, 2023

(54) INFORMATION PUSHING METHOD, STORAGE MEDIUM AND SERVER

(71) Applicant: Tencent Technology (Shenzhen) Company Limited, Shenzhen (CN)

(72) Inventors: Zhiqing Zhang, Shenzhen (CN); Jiaming Wu, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 1101 days.

(21) Appl. No.: 16/208,226

(22) Filed: Dec. 3, 2018

(65) Prior Publication Data

US 2019/0102652 A1    Apr. 4, 2019

Related U.S. Application Data

(63) Continuation-in-part of application No. PCT/CN2017/099790, filed on Aug. 31, 2017.

(30) Foreign Application Priority Data

Aug. 31, 2016 (CN) .......................... 201610797458.3

(51) Int. Cl.
*G06K 9/62* (2022.01)
*G06Q 30/02* (2012.01)
*G06F 16/9535* (2019.01)

(52) U.S. Cl.
CPC ....... *G06K 9/6218* (2013.01); *G06F 16/9535* (2019.01); *G06K 9/623* (2013.01);
(Continued)

(58) Field of Classification Search
CPC .................. G06Q 30/0251–30/0271; G06Q 30/02–30/0284; G06F 16/9535
See application file for complete search history.

(56) References Cited

U.S. PATENT DOCUMENTS 6,912,505 B2 * 6/2005 Linden ............... G06Q 30/0601
705/14.67
2004/0122819 A1   6/2004 Heer et al.
(Continued)

FOREIGN PATENT DOCUMENTS

CN       101082972 A    12/2007
CN       101520878 A     9/2009
(Continued)

OTHER PUBLICATIONS

Linden et al., "Amazon.com Recommendations: Item-to-Item Collaborative Filtering", Industry Report, Published by the IEEE Computer Society, IEEE Internet Computing, Jan. • Feb. 2003, pp. 76-80. (Year: 2003).*

(Continued)

*Primary Examiner* — Brian Werner
(74) *Attorney, Agent, or Firm* — Morgan, Lewis & Bockius LLP

(57) ABSTRACT

A server acquires a feature label vector of each seed user and forms a first number of clusters corresponding different information categories according to the feature label vectors of the seed users. The server calculates a central vector of each cluster according to the feature label vectors of the seed users in the cluster. The server acquires a feature weight vector corresponding to the information categories. The server acquires a feature label vector of each potential user. The server calculates first distances from the potential users to the central vector of the information categories according to the feature label vectors of the potential users, feature weight vectors and central vectors corresponding to the information categories. The server selects a second number of potential users corresponding to the shortest first distances from the first distances and sends them information
(Continued)

that is matched with corresponding information categories of the target users.

20 Claims, 7 Drawing Sheets

(52) U.S. Cl.
CPC ........... *G06K 9/6215* (2013.01); *G06Q 30/02* (2013.01); *G06Q 30/0201* (2013.01)

(56) References Cited

U.S. PATENT DOCUMENTS

| | | | | |
|---|---|---|---|---|
| 2008/0243637 | A1* | 10/2008 | Chan | G06Q 30/02 705/26.1 |
| 2014/0337347 | A1* | 11/2014 | Cheng | G06F 16/35 707/738 |

FOREIGN PATENT DOCUMENTS

| | | |
|---|---|---|
| CN | 101535944 A | 9/2009 |
| CN | 103077220 A | 5/2013 |
| CN | 104063801 A | 9/2014 |
| CN | 104111946 A | 10/2014 |
| CN | 104408642 A | 3/2015 |
| CN | 105447730 A | 3/2016 |
| CN | 105681089 A | 6/2016 |
| CN | 105787061 A | 7/2016 |
| CN | 105868243 A | 8/2016 |
| CN | 106355449 A | 1/2017 |

OTHER PUBLICATIONS

Tencent Technology, ISRWO, PCT/CN2017/099790, dated Nov. 22, 2017, 7 pgs.
Tencent Technology, IPRP, PCT/CN2017/099790, dated Mar. 5, 2019, 6 pgs.

* cited by examiner

INFORMATION PUSHING METHOD, STORAGE MEDIUM AND SERVER

PRIORITY CLAIMS AND RELATED APPLICATIONS

This application is a continuation-in-part application of PCT application number PCT/CN2017/099790, entitled "INFORMATION PUSHING METHOD, STORAGE MEDIUM AND SERVER", filed on Aug. 31, 2017, which claims priority to Chinese Patent Application No. 201610797458.3, entitled "USER SELECTION METHOD AND DEVICE" filed on Aug. 31, 2016, all of which are incorporated by reference in their entirety.

FIELD OF THE TECHNOLOGY

The present disclosure relates to the technical field of information processing, more particularly to an information pushing method, a storage medium and a server.

BACKGROUND OF THE DISCLOSURE

Along with development of big data application, a large amount of user information such as preference, ages, careers and demands of users is stored in instant messaging and social application platforms, and the user information has important reference value on whether information, such as information about product advertising, may be pushed or not.

In the conventional technical scheme, a massive number of collected users are simply screened generally, for example, users who browsed information which is the same as or similar to information which is about to be pushed by service providers are selected as target users, and push information of the related service providers is provided for the target users. But in real life, each user is an independent existence and has diversified characters, and the simple way for screening the target users for whom the information is provided is not accurate enough.

SUMMARY

Targeted advertising or information pushing relies on identifying users that are more likely to be receptive to pushed information based on analysis of the user's characteristics and the information category of the pushed information. Improving the techniques for identifying the correct target audience for a type of information helps to reduce resources expended on information pushing that is both annoying to the users and costly for the advertisers. Due to the massive number of users and the complexity of the user's characteristics, it is difficult for a human being to accurately predict a suitable match based on a mental process. It is also difficult to design a matching algorithm that provides good matching results. Researchers continuously develop new techniques to improve the targeting accuracy of the information pushing.

Some prior art solutions construct a feature tag (individual portrait) of each individual in the crowd according to the browsing, searching, and purchasing habits of the crowd. Based on each individual feature tag, according to different marketing needs, set up screening rules, and select potential users who meet the requirements from the total crowd to conduct targeted marketing. Some prior art solutions obtain the seed population and determine the weight vector of the seed population feature through a first preset model, perform the initial diffusion based on this, and based on the historical data. The results are sorted to form an optimal candidate group. Then through the second preset model, the weight vector of the optimal candidate group feature is determined, and the secondary diffusion is performed based on this result to generate the final target population.

The prior art solutions have very significant drawbacks compared with the present technical solutions. Although the prior art solutions construct labels (individual portraits) for individual individuals in the group, there is no specific explanation on how to use the portrait results. Therefore, the existing solutions cannot ensure that the screening rules are set properly and may result in some potential users being ignored and some non-potential users are mistakenly selected as marketing targets. The result of the user's portrait in this presently disclosed technical solution is used for the analysis of the clustering algorithm, and according to the result, a weight vector of the seed population feature under each cluster is generated, thereby effectively improving the matching accuracy.

Some existing technical solutions can only complete the screening process of marketing objects from many to a few, and cannot expand the number of marketing size and expand the scope of actual marketing objects. The present technical solution focuses on how to expand the marketing scope from a small number of seed populations to more potential users. Compared with the screening process of the prior art solutions, the present technical solution is a diffusion technology and can effectively expand the scope of marketing, and differ essentially from the existing technology solutions.

Some prior art solutions analyze the seed population directly analyzed, the weight vector of the seed population feature is determined by the first preset model, and the initial diffusion is performed based on this. However, in the actual business, the seed population is uploaded by the customer, and the seed population characteristics are more confusing, so it is difficult to obtain a convergent seed population crowd weight value vector. For example, a customer belongs to the field of clothing, and the seed population it provides is a group of customers who have had purchasing behaviors on their products, while some of the seed populations are buying or collecting clothes for their men's clothing, and the other customers are women. Jewelry generates a purchase or collection behavior. At this time, if only the crowd's feature weight vector is determined for the entire population, clustering and then analyzing the two groups of people separately will make the population analysis inaccurate, resulting in the proliferation of target populations. Accurate, marketing effects will be greatly affected. The presently disclosed technical scheme clusters the individual characteristics of the seed population and analyzes the seed populations under each cluster. Therefore, compared with prior art solutions, the present technical solution not only can improve the convergence speed, but also can make the analysis result more accurate and the marketing effect can be improved.

Furthermore, after the initial diffusion, the prior art solutions may sort the candidate population generated by the initial diffusion according to the historical data, and selects the optimal candidate group according to the ranking result as a basis for the secondary diffusion. However, this is often difficult to satisfy in practical applications. The potential user group is usually a crowd that has not purchased or collected the marketing product. Therefore, the potential user population usually does not have historical data. The prior art solutions naturally cannot sort and select the best candidate group. There is no way to talk about the next steps. However, in the current technical solution, the clustering algorithm has been used to generate the clusters of the seed population in the previous step. Therefore, the distance between the clustering centers of each candidate potential individual and the respective seed population can be used to sort the clusters. Pick out the target group. Therefore, compared with the prior art solutions, the present technical solution has higher practicality and operability.

Finally, the prior art solutions have no feedback and correction mechanism after targeted marketing of the selected population, and therefore cannot improve the marketing accuracy in many iterations. In the long term, the orientation accuracy cannot be guaranteed and it will result in marketing. The waste of costs will also cause the selected users to gradually feel disgusted with the product. Compared with the prior art solutions, the current technical solution adopts a feedback mechanism after conducting targeted marketing to the diffused population, and statistically analyzes the feedback of the marketing object, and feeds this result back to each poly. In the class, the vector of feature weights under each cluster is corrected. After repeated iterations, the accuracy of targeted marketing can be further improved.

In conclusion, compared with the prior art solutions, the currently disclosed technical solution achieves a more efficient and accurate diffusion process of the seed population, improves the accuracy of targeted marketing, and significantly improves marketing effectiveness through feedback and correction mechanisms.

This disclosure discloses a method for accurate population spreading based on the characteristics of the seed population, which is characterized in that: the seed population is analyzed, and according to the browsing, searching, collecting and purchasing habits of the seed population, each individual characteristic label in the seed population is constructed. Based on the characteristics of individual individuals in the seed population, a clustering algorithm was used to form various clusters in the seed population, and the seed populations under each cluster were separately analyzed to obtain the feature weight vector of each cluster of the seed population. Analyze all potential users (e.g., the general population), and build individual feature labels for potential users based on potential users' browsing, searching, collecting, and buying habits. Through the abovementioned seed crowd feature weight vector under each cluster, combined with each individual feature tag of potential users, the candidate potential user groups corresponding to each cluster are respectively diffused (expanded). According to the distances of each candidate potential user group from each cluster center, they are sorted separately. Ultimately, according to the customer's needs, the potential users in the top potential user groups are selected as the target population to promote marketing information. After promotion, according to the user's forward and backward feedback, further correct the feature weight vector under each cluster. The invention can increase the directional precision while expanding the marketing scope, thereby significantly improving the marketing effect.

Various embodiments of the present disclosure provide an information pushing method, a storage medium and a server.

In one aspect, a method is performed at a server having one or more processors and memory. The server acquires a respective feature label vector of each seed user of a plurality of seed users. The server forms a first preset number of clusters corresponding to the first preset number of information categories according to the respective feature label vectors of the plurality of seed users. The server calculates a central vector of a corresponding cluster according to the respective feature label vectors of the seed users in each cluster of the first preset number of information categories. The server acquires a feature weight vector corresponding to the information categories the first preset number of information categories. The server acquires a respective feature label vector of each potential user in a potential user group. The server calculates respective first distances from the potential users to the central vector of the first preset number of information categories according to the feature label vectors of the potential users, the feature weight vectors and the central vectors corresponding to the first preset number of information categories. The server selects a second number of potential users corresponding to the shortest first distances from the first distances for as target users. The server transmits push information which is matched with corresponding information categories of the target users to the terminals of the target users.

According to a second aspect of the present disclosure, a server includes one or more processors and memory, and a plurality of instructions stored in the memory that, when executed by the one or more processors, cause the server to perform the aforementioned method.

According to a third aspect of the present disclosure, a non-transitory computer readable storage medium storing a plurality of instructions configured for execution by a server having one or more processors, the plurality of instructions causing the server to perform the aforementioned method.

Details of one or more embodiments of the present disclosure are provided in the following accompanying drawings and descriptions. Other features, objectives, and advantages of the present disclosure become clear in the specification, the accompanying drawings, and the claims. The details of one or more embodiments of the present disclosure are set forth in the accompanying drawings and the description below. Other features, objects and advantages of the present disclosure will be apparent from the description, the accompanying drawings and the claims.

BRIEF DESCRIPTION OF THE DRAWINGS

In order to more clearly illustrate the technical schemes of the embodiments of the present disclosure or the existing technology, the following briefly introduces the accompanying drawings required for describing the embodiments or the existing technology. Apparently, the accompanying drawings in the following description show only some embodiments of the present disclosure, and a person of ordinary skill in the art may still derive other drawings from these accompanying drawings without creative efforts.

DESCRIPTION OF EMBODIMENTS

In order to make the objects, technical scheme and advantages of the present disclosure more clear and obvious, the present disclosure will be further illustrated in detail in combination with accompanying drawings and embodiments hereinafter. It should be understood that the specific embodiments described here are used only to explain the present disclosure, rather than limiting it.

Figure 1:
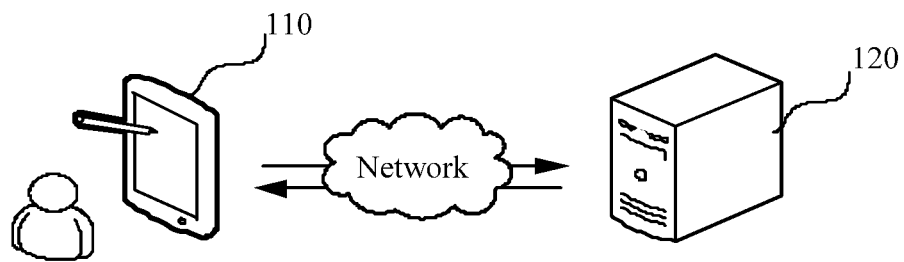
FIG. 1 is an application environment diagram of an information pushing method in an embodiment.

An information pushing method provided by the embodiments of the present disclosure can be applied to an application scene as shown in FIG. 1. Referring to FIG. 1, a client terminal 110 may interact with a server 120 through a preset network. The client terminal 110 is a terminal of a service provider required to transmit push information to users, and includes, but is not limited to, a smart phone, a tablet personal computer, a palmtop computer and the like with a communication function. The server 120 is a server of a platform stored with a large amount of user information and used for social contact, instant messaging or shopping or the like, and a potential user group is formed by the large number of users. Each potential user in the server 120 has lots of pieces of feature information, feature label vectors can be formed according to the pieces of feature information, and features of the users may be reflected through the feature label vectors. The client terminal 110 can transmit a selection request for selecting suitable users to the server 120 so as to transmit related push information to the selected users. The server 120 can acquire the feature label vector of each seed user according to the request, and the seed users are generally users who purchased or collected related products of a service provider; and the central vector corresponding to the information of each category in a first number of preset information categories is calculated according to the feature label vectors of all the seed users, wherein the first number is matched with the number of categories of information which is about to be recommended by the service providers, and the information of each category correspondingly has one central vector. The server 120 further has feature weight vectors corresponding to the feature label vectors, and first distances from the potential users to the central vector of each category are calculated according to the feature label vectors, the feature weight vectors and the central vector of the potential users; and then a second number of potential users corresponding to the shortest distances are selected from the first distances as target users for whom information is pushed, and thus, selection to the users is implemented.

Figure 2:
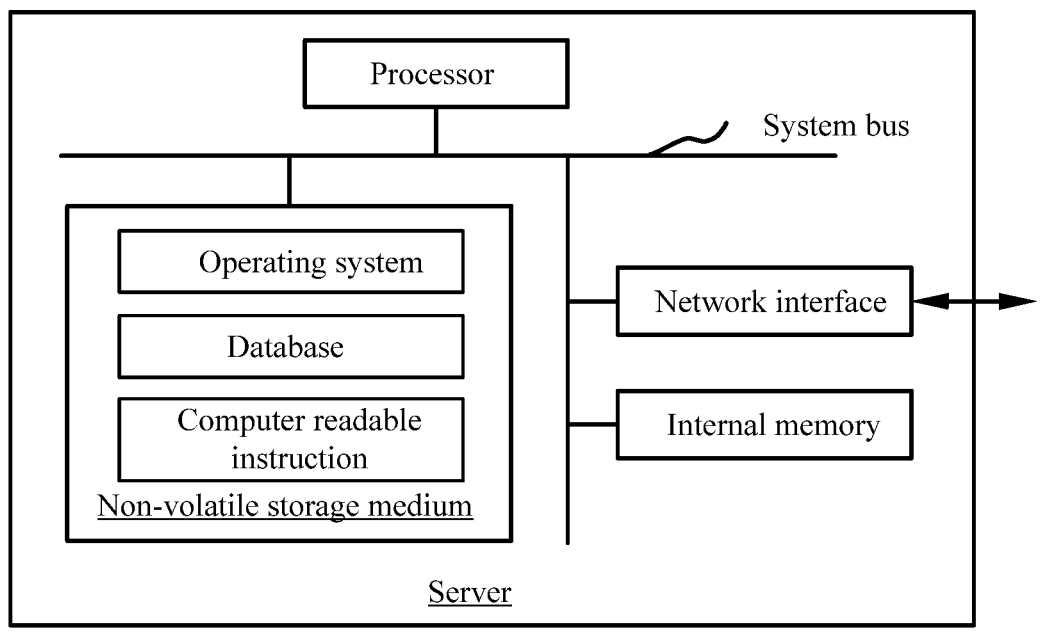
FIG. 2 is an internal structure diagram of a server configured to implement the information pushing method in an embodiment.

In an embodiment, the internal structure of the server 120 in FIG. 1 is as shown in FIG. 2, the server includes a processor, a non-volatile storage medium, an internal memory and a network interface which are connected through a system bus, wherein the non-volatile storage medium of the server stores an operating system, a database and a computer readable instruction. The database is used for storing data such as the feature label vector of each potential user, and the center vector and the feature weight vectors of the information of each category. When the computer readable instruction is executed by the processor, an information pushing method provided in various embodiments of the present disclosure may be implemented by the processor. The processor of the server is configured to provide calculating and control ability and support running of the whole server. The internal memory of the server provides a high-speed caching running environment for the operating system, the database and the computer readable instruction in the non-volatile storage medium. The network interface of the server can be an Ethernet card or a wireless network card or the like, and is configured to be in communication with an external terminal or server through network connection, for example, the network interface receives a selection request transmitted from the terminal 110 or transmits push information and the like to terminals corresponding to the selected users. The server can be implemented by an independent server or a server cluster consisting of multiple servers. Those skilled in the art can appreciate that the structure shown in FIG. 2 is only a block diagram of part of the structure related to the scheme of the present disclosure, and does not constitute a limitation to the server to which the scheme of the present disclosure is applied, the specific server may comprise more or less components as shown in figures, or a combination of some components, or different arrangements of the components.

Figure 3:
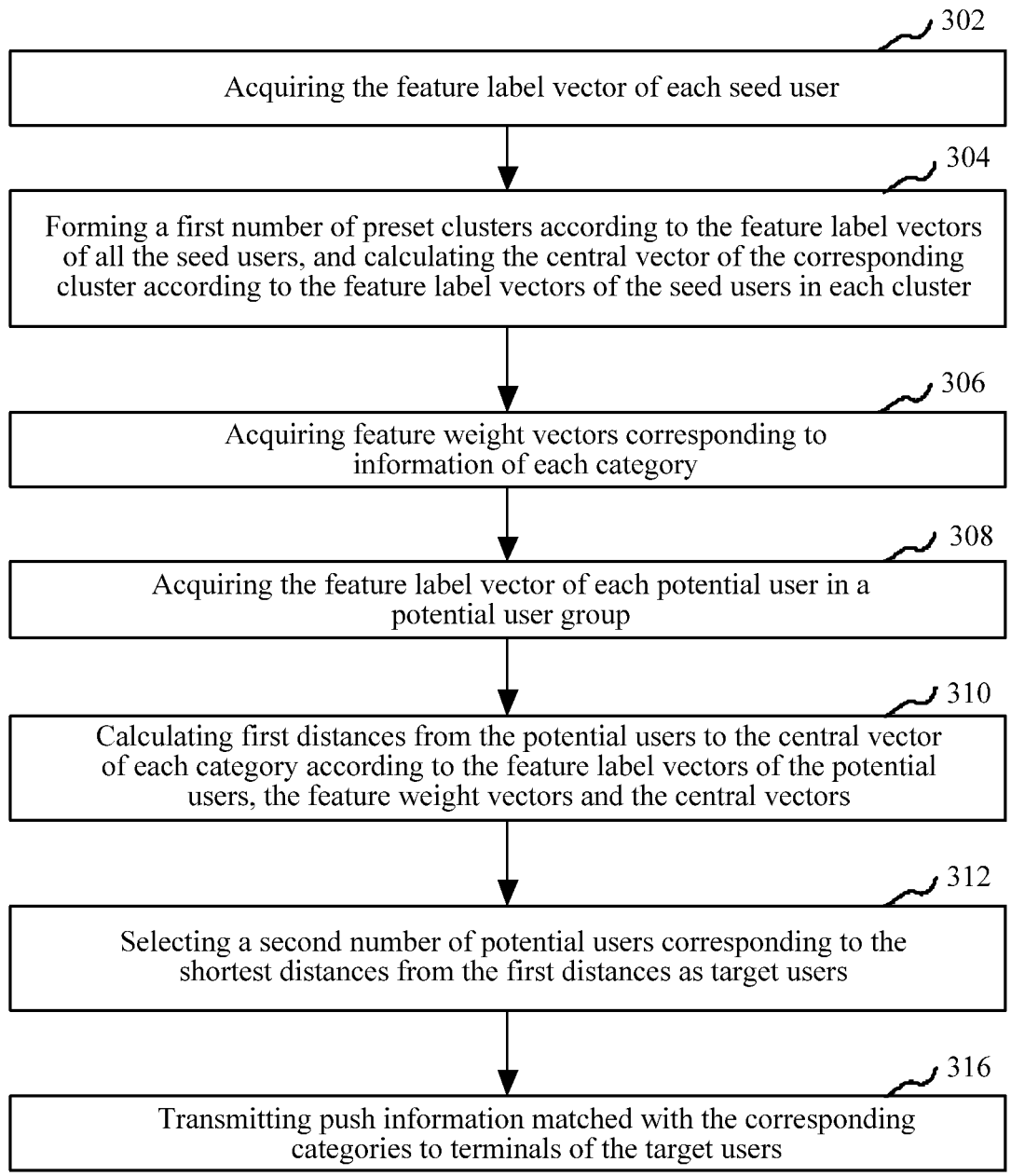
FIG. 3 is a flow diagram of the information pushing method in an embodiment.

In an embodiment, as shown in FIG. 3, an information pushing method is provided, and the method can be applied to the server as shown in FIG. 1, and specifically includes the following steps:

Step 302: acquire the feature label vector of each seed user.

In the embodiment, the server can receive a user selection request transmitted by a client terminal of a service provider in advance, the user selection request includes specific categories of information required to be pushed by the service provider, and feature information of a certain amount of seed users, and the corresponding feature label vectors are established according to the feature information of the seed users provided by the service provider, wherein the push information can be arbitrary information, and the number of categories of the push information is a first number. For example, if the push information is clothing information, when the specific categories are divided into three categories including men's clothing, women's clothing and children's clothing, correspondingly, the first number is 3. For example, if the push information is sporting goods, when the specific categories are divided into four categories including basketball, footwall, volleyball and tennis, correspondingly, the first number is 4.

The seed users are sample users provided by the server, and are research objects for determining users for whom information will be recommended subsequently. Generally, users who have high influence and high activity are selected as the seed users, for example, the seed users may be users who purchased or collected related products of the service provider, or users who tried the related products of the service provider and carried out operations of adding the related products of the service provider into shopping carts and the like. The number of the seed users can be an arbitrary number such as 10,000 and 50,000, and a seed user group is formed by all the seed users. The feature information is information for embodying characters of a certain dimensionality or various dimensionalities of the users. For example, the feature information can include one or more pieces of personal basic information including ages, sex, careers, incomes, education backgrounds, living cities and the like of the users, and can further include behavior information for reflecting aspects such as behavioral habits of the users. For example, when to-be-pushed information is shopping information, the behavior information may include record information of one or more behaviors, including search, collection, browsing, purchasing and the like on the corresponding products, of the users; and under the condition that the to-be-pushed information is video, audio, direct broadcasting room and radio host recommending information and the like, the behavior information may include record information of one or more behaviors, including search, collection, accessing and the like on information such as video, audio, direct broadcasting rooms and radio host recommending, of the users.

The server can correspondingly quantify the feature information of each seed user according to a preset quantifying rule, and establish the feature label vectors of the corresponding seed users according to preset feature labels in required categories. The feature label vectors are a kind of feature information having dimensionalities in a certain length, and parameters on each dimensionality of the feature information correspondingly represent the seed users, namely, the feature label vectors consist of multiple pieces of feature information of the selected seed users.

The category of the selected feature information is set as n, the expression mode for the feature label vector of an $i^{th}$ seed user can be $(y_{i1}, y_{i2}, \ldots y_{in})$, wherein the parameter $y_{im}$ is used for representing an $m^{th}$ piece of feature information of the $i^{th}$ seed user, for example, the category of the selected feature information separately includes 6 kinds of basic information including ages, sex, careers, incomes, education backgrounds and living cities, and further includes 4 kinds of behavior information such as search, collection, browsing and purchasing record for reflecting behavioral habits of the users, and then n is 6. Corresponding feature label vectors are established according to the category sequence successively, and then $y_{i1}$ to $y_{i10}$ separately represent specific feature information such as ages, sex, careers, incomes, education backgrounds, living cities, search, collection, browsing and purchasing record of the $i^{th}$ seed user.

Step 304: form a first number of preset clusters according to the feature label vectors of all the seed users, and calculate the central vector of corresponding cluster according to the feature label vectors of the seed users in each cluster.

In the embodiment, the number of formed clusters (namely the first number) is the number of categories of preset to-be-pushed information. The server can correspondingly categorize the seed users according to the specific information categories for categorizing the to-be-pushed information, thus, each seed user is categorized into one or more clusters corresponding to the categories of the to-be-pushed information to form the first number of clusters, and each cluster corresponds to a category of the to-be-pushed information.

The feature label vector is reflected as a specific point in a space coordinates system, and the feature label vectors of the seed users categorized into the same category are located in the same cluster. The server can calculate the central point of each cluster according to the first number of clusters formed by the feature label vectors of all the seed users, and the central point serves as the central vector of the information of the category, and the central vector is the cluster center of the corresponding cluster, wherein the clusters are in one-to-one correspondence to the categories of information. In an embodiment, for each formed cluster, the feature label vectors of the seed users in the cluster can be extracted, the central vector corresponding to the information of the corresponding category is calculated according to a preset clustering algorithm, and the clustering algorithm can be any one of clustering algorithms including K-means, K-medoids or Clara or the like.

The calculated central vector is used for representing feature information shared by the seed users corresponding to the information of a certain category, the mode of the central vector is the same as the mode of the feature label vectors, the length of the dimensionalities of the central vector is the same as the length of the dimensionalities of the feature label vectors, and parameters on each dimensionality of the central vector correspondingly represent a piece of feature information shared by the seed users. The central vector is reflected as a specific point in the space coordinates system. The expression mode of the n-dimensional central vector of a $k^{th}$ kind of information can be $(x_{k1}, x_{k2}, \ldots x_{kn})$, wherein the parameter $x_{km}$ is used for representing an $m^{th}$ piece of feature information shared by the seed users corresponding to the $k^{th}$ kind of information.

Figure 4:
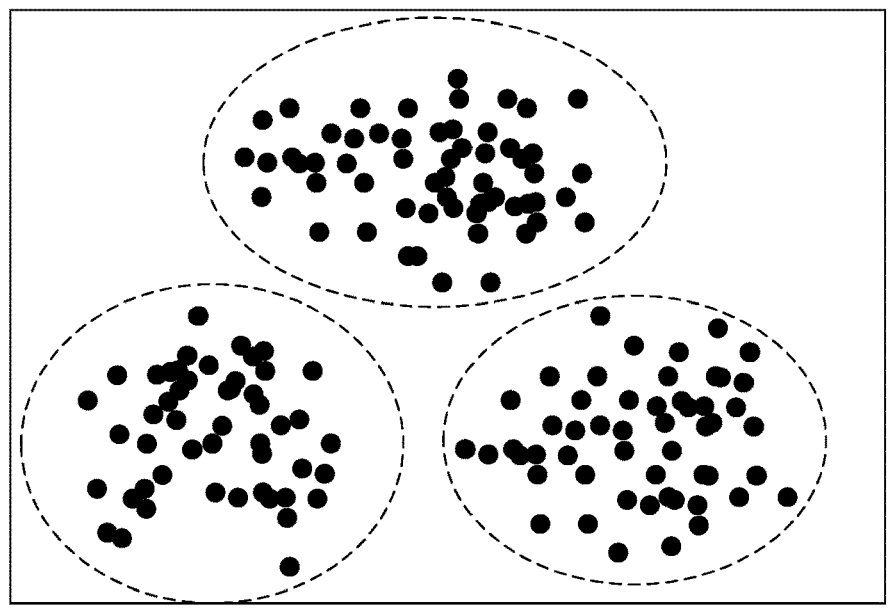
FIG. 4 is a schematic diagram of clusters in an embodiment.

FIG. 4 is a schematic diagram of carrying out clustering on the feature label vectors in an embodiment. Each point in the diagram represents the feature label vector of the corresponding seed user, points located in the same circle form a cluster, the corresponding central point can be calculated through all the points in the circle, and the central point is the central vector of the information of the corresponding category.

For example, if push information is clothing information, the information categories are divided into three categories including men's clothing information, women's clothing information and children's clothing information, and by the server, formed clusters in the upper middle portion, the lower left portion and the lower right portion in FIG. 4 can correspond to the men's clothing information, the women's clothing information and the children's clothing information separately according to the preset clustering algorithm. The calculated three central vectors are separately central vectors corresponding to the men's clothing information, the women's clothing information and the children's clothing information.

Step 306: acquire feature weight vectors corresponding to the information of each category.

In the embodiment, a corresponding first number of feature weight vectors are further set by the server according to the specific categories of information required to be pushed, and the feature weight vectors are in one-to-one correspondence to information of the corresponding categories, wherein the feature weight vectors corresponding to the information of the different categories can be the same or different. Similarly, the dimensionalities of the feature weight vectors are the same as the dimensionalities of the feature label vectors. Each parameter of the feature weight vector is a weight, which corresponds to the parameter of the feature label vector, in the feature label vector. The expression mode can be $(w_{k1}, w_{k2}, \ldots w_{kn})$, wherein $w_{ki}$ is used for reflecting the weight of the $i^{th}$ parameter)), of the feature label vector corresponding to the $k^{th}$ kind of information. The weights corresponding to the different parameters in the feature label vectors can be the same or different, and a larger weight can be correspondingly set for the feature information which has higher correlativity with the category of the to-be-pushed information. For example, when information categories are divided into three categories including the men's clothing information, the women's clothing information and the children's clothing information and feature vector labels represent parameters including ages, sex, careers and the like, relatively large weights may be separately set for the parameters which reflect sex in the feature weight vectors corresponding to the men's clothing information and the women's clothing information, and a relatively small weight may be set for the parameters which reflect sex in the feature weight vectors corresponding to the children's clothing information.

Step 308: acquire the feature label vector of each potential user in a potential user group.

In the embodiment, a large number of users are stored in the server, the users are potential users for whom information is suitable to be pushed, and the corresponding potential user group is formed by the users stored in the server. Similarly, the potential users also have one or more pieces of feature information including ages, sex, careers, incomes, education backgrounds, living cities, shopping habits and the like. Feature label vectors of the potential users may be established by the server according to a mode of establishing the feature label vectors of the seed users, the mode of the feature label vectors of the potential users, the mode of the feature label vectors of the seed users and the mode of the central vectors are the same, and the meaning of parameters in the feature label vectors of the potential users, the meaning of parameters in the feature label vectors of the seed users and the meaning of parameters in the central vectors are also the same.

In an embodiment, the execution sequence of foregoing steps 302-304, 306 and 308 may not be limited, namely, the sequence of calculation of the central vectors, acquisition of the feature weight vectors and acquisition of the feature label vectors of the potential users is not limited.

Step 310: calculate first distances from the potential users to the central vector of each category according to the feature label vectors of the potential users, the feature weight vectors and the central vectors.

In the embodiment, the distances from the potential users in the potential user group to each central vector can be calculated by the server. Each parameter in the feature label vector of a certain specific potential user can subtract the corresponding parameter in the central vector of the cluster corresponding to the information of a category to obtain a difference value, then the difference value is subjected to square operation, and a square value multiplies the corresponding parameter in the feature weight vector corresponding to the information of the category to obtain a corresponding product. The products of the different parameters are added together to obtain a value which is the first distance of the central vector of the corresponding category.

In an embodiment, the first distances can be calculated by a formula $$d_{kj} = \sum_{i=1}^{n} w_{kj}(z_{ji} - y_{kj})^2,$$

wherein $d_{kj}$ represents the first distance from a $j^{th}$ potential user to the central vector corresponding to the $k^{th}$ kind of information, n represents dimensionalities of the feature label vectors, the feature weight vectors and the central vectors, $w_{kj}$ represents a $j^{th}$ parameter in an n-dimensional feature weight vector corresponding to the $k^{th}$ kind of information, $z_{ij}$ represents a $j^{th}$ parameter in the n-dimensional feature label vector of an $i^{th}$ potential user, and $y_{kj}$ represents a $j^{th}$ parameter of the n-dimensional central vector of the $k^{th}$ kind of information. By the calculating formula, the first distance from each potential user to the central vector of each category can be calculated separately.

Step 312: select a second number of potential users corresponding to the shortest distances from the first distances as target users.

In the embodiment, the lengths of the first distances can reflect the matching degree that whether the information of the corresponding categories is suitable for being transmitted to the potential users. If the calculated distances are shorter, it shows that the potential users are closer to the central vector of the information of the corresponding categories, then the matching degree between the potential users and the information of the corresponding categories is higher, and thus, the information of the corresponding categories is more suitable for being transmitted to the users.

For example, information categories are still divided into three categories including the men's clothing information, the women's clothing information and the children's clothing information, and the first distance from the feature label vector of each user to the central vector of the men's clothing information, the first distance from the feature label vector of each user to the central vector of the women's clothing information and the first distance from the feature label vector of each user to the central vector of the children's clothing information can be calculated separately. For a specific potential user, in the three first distances, if the numerical value of the first distance from the feature label vector of the specific potential user to the central vector of the women's clothing information is the smallest, it determines that the women's clothing information in the three categories of information is the most suitable for being pushed to the user. For all the potential users in the potential user group, the lengths of the first distances of each category can be ranked, a preset number of potential users corresponding to the shortest first distances in the corresponding category are selected, and then push information which is matched with the category is pushed for the potential users.

In an embodiment, a second number is a number which can be preset, namely, the number of target users required to be collected is preset. All the calculated first distances can be ranked by the server, a corresponding number of the shortest first distances are selected according to the rank, the users corresponding to the shortest first distances are selected as the target users, and thus, corresponding push information can be transmitted to the target users.

In another embodiment, the second number may not be set in the server, but a distance threshold value is set, and the potential users corresponding to the first distances which are smaller than the distance threshold value are selected as the target users. The number of the selected target users is calculated and serves as the second number.

Step 314: transmit push information matched with the corresponding categories to the terminals of the target users.

In the embodiment, after the target users are selected by the server, corresponding category identifiers can be set for the target users, and the information of the categories which are matched with the category identifiers is selected from information which is about to be recommended, and the information serves as push information and is transmitted to the target users, wherein the server can transmit the push information matched with the corresponding categories to the terminals of the target users by one or more push modes including short messages or E-mails or the like. Because the accuracy of the selected target users is high, the probability that the push information is received by the target users is relatively high after the corresponding push information is transmitted to the target users.

In an embodiment, the information of the target users can be transmitted to a client terminal, so that the client terminal can push the information to the terminals of the target users.

In the embodiment, the server can transmit the information of the selected target users to the client terminal of the service provider, the information of the target users includes one or more of contact numbers, E-mails, account numbers (such as instant messaging account numbers) of an application corresponding to the server, and the like of the target users, and further includes the corresponding category identifiers, thus, after the client terminal receives the information of the target users, recommend information which is matched with the corresponding target users can be acquired according to the category identifiers, and then the recommended information matched with the corresponding target users can be transmitted to the target users by the client terminal. Similarly, the client terminal may also transmit the push information matched with the corresponding categories to the terminals of the target users by one or more push modes including short messages or E-mails or the like, because the accuracy of the selected target users is high, the probability that the push information is received by the target users is relatively high after the corresponding push information is transmitted to the target users.

According to the information pushing method provided by the embodiment, the central vector corresponding to the information of each category is calculated through the acquired feature vector of each seed user and a first number of preset information categories, and then the first distances from the potential users to the central vector of each category are calculated according to the feature label vectors of the potential users, the feature weight vectors and the calculated central vectors; and a second number of potential users corresponding to the shortest distances are selected from the calculated first distances corresponding to all the potential users as target users to whom the corresponding push information can be transmitted. Because the information is categorized in advance by the method, the calculated first distances can reflect the matching degree between the corresponding potential users and the information of the corresponding categories, if the distances are shorter, it shows that the information of the corresponding categories is more suitable for being transmitted to the users, and thus, the selected target users are more accurate.

In an embodiment, step 304 includes: determine the categories of the feature label vectors of the corresponding seed users according to category identifiers when the information of the seed users includes the category identifiers so as to form a first number of clusters of categories; and calculate the central point of each cluster, and take the central point as the central vector of the information of the corresponding category.

In the embodiment, after the server receives the user selection request, whether the information of the seed users includes the category identifiers or not can be detected, and the category identifiers are configured to identify related products, which were collected or purchased by the corresponding seed users, of the service provider or the categories of the products.

When the information of the seed users includes the category identifiers, the related products, which were collected or purchased by the seed users, of the service provider or the categories of the products can be known according to the category identifiers, and thus, the categories of the push information which is matched with the products or the categories of the products can be determined. Then the feature label vectors of the seed users are categorized into the clusters of the information of the determined categories. The feature label vectors of the seed users can be categorized by the server, so that a first number of clusters of the categories are formed.

After a first number of clusters of the categories are formed, the corresponding central point can be calculated according to the feature label vectors in each cluster, and the central point is the central vector of the information of the corresponding category. In an embodiment, the feature label vectors in each cluster can be subjected to arithmetical averaging, and an obtained average value serves as the corresponding central vector.

Because the information of the seed users includes the category identifiers, the corresponding seed users can be accurately clustered according to the category identifiers, and the accuracy of the calculated central vectors can be improved. Because the first distances are relevant to the central vectors, the accuracy of follow-up calculation to the first distances can further be improved, and the accuracy of selection to the target users is improved.

Figure 5:
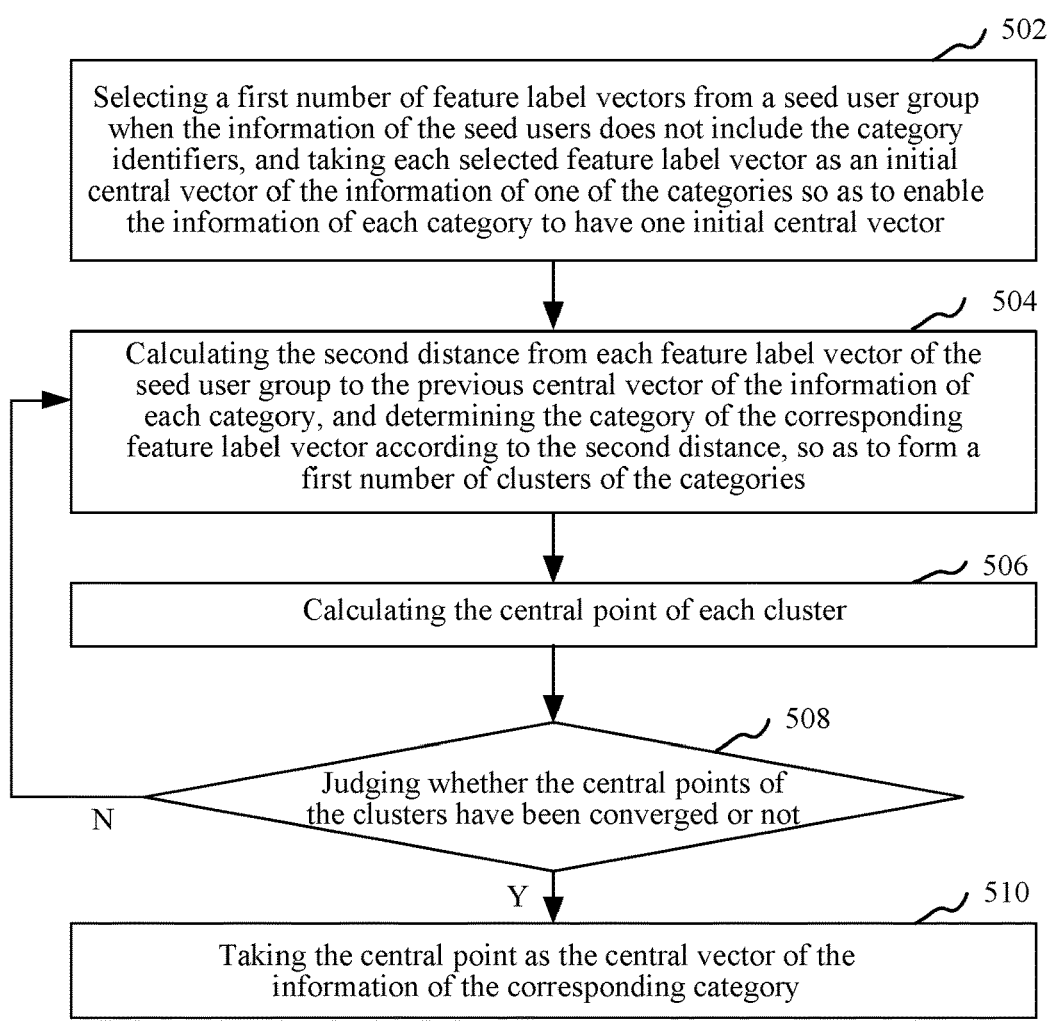
FIG. 5 is a flow diagram of a step of forming a first number of preset clusters according to the feature label vectors of all seed users, and calculating the central vectors of the corresponding cluster according to the feature label vectors of the seed users in each cluster in an embodiment.

In an embodiment, as shown in FIG. 5, step 304 includes:

Step 502: select a first number of feature label vectors from the seed user group when the information of the seed users does not include the category identifiers, and take each selected feature label vector as the initial central vector of information of one of the categories so as to enable the information of each category to have one initial central vector.

When the information of the seed users does not include the category identifiers, the feature label vectors of the seed users of which the number equals to that of the information categories may be selected from the seed user group by the server, each selected feature label vector serves as the initial central vector of the information of the corresponding category so that the information of each category has one initial central vector, wherein the server can select a first number of feature label vectors by using a preset random function, and each selected feature label vector randomly serves as the corresponding initial central vector.

For example, the first number is n, and n to-be-formed clusters are recorded as cluster 1, cluster 2, . . . , cluster n. The server can select n different feature label vectors from the seed user group, and the n selected feature label vectors are recorded as vector 1, vector 2, . . . , vector n. The vector 1, vector 2, . . . , vector n can separately serve as the initial central vectors of the cluster 1, cluster 2, . . . , cluster n, so that the information of each category has one initial central vector.

Step 504: calculate the second distance from each feature label vector of the seed user group to the previous central vector of the information of each category, and determine the category of the corresponding feature label vector according to the second distance to form a first number of clusters of the categories.

After the information of each category has the corresponding central vector, second distances from the feature label vectors of the rest of seed users to each initial central vector are separately calculated, an initial central vector which is the closest to each seed user is determined according to the corresponding second distance, and then the feature label vector of the seed user is categorized into the category corresponding to the initial central vector. The feature label vectors of the seed users can be categorized by the server, so that a first number of clusters of the categories are formed.

The first central vector is the initial central vector, and when step 504 requires to be carried out again subsequently, the previous central vector of each category is the central point, which is calculated in step 506, of the corresponding cluster.

Step 506: calculate the central point of each cluster.

In the embodiment, after a first number of clusters of the categories are formed, the corresponding central point can be calculated according to the feature label vectors in each cluster, and is a new central vector of the information of the corresponding category. In an embodiment, the feature label vectors in each cluster can be subjected to arithmetical averaging, and the obtained average value serves as the corresponding new central vector.

Step 508: judge whether the central points of the clusters have been converged or not; carry out step 510 if the central points of the clusters have been converged, and continue carrying out step 504-508 if the central points of the clusters have not been converged until it determines that the central points of the clusters have been converged.

In an embodiment, whether a difference value between the calculated new central point and the previous central point is smaller than a preset distance value or not is judged. If the difference value between the calculated new central point and the previous central point is smaller than the preset distance value, it determines that the calculated central point converges, and if the difference value between the calculated new central point and the previous central point is not smaller than the preset distance value, it determines that the calculated central point does not converge.

In the embodiment, a distance value is correspondingly preset in the server, and the distance value serves as a standard for judging whether the corresponding central point converges or not. When the central point of one or more clusters does not converge, step 504 can be continued being carried out, and the information of the different categories is clustered again. The central point of each cluster is the previous central vector of the information of the corresponding category. If the difference value between the calculated new central point and the previous central point is smaller than the preset distance value, it shows that the calculated new central point converges, and thus, the calculated new central point can serve as the final central vector of the information of the category. Particularly, when it determines that the calculated new central point does not converge, the central point of each cluster calculated at present serves as the previous central vector of the information of the corresponding category, the process returns to foregoing step 504, steps 504-508 are continued to be carried out, the second distance from each feature label vector of the seed user group to the previous central vector of the information of each category is calculated until it determines that the calculated central point of the cluster converges, and then step 510 is carried out.

Step 510: take the central point as the central vector of the information of the corresponding category.

When it determines that the central points of all the clusters have been converged, the central point can serve as the final central vector of the information of the corresponding category.

In the embodiment, whether the formed central vector converges or not is judged, if the formed central vector does not converge, the information of the categories is clustered at first, the central points are calculated again according to formed new clusters until the central point of each category converges, then the central point can serve as the final central vector of the information of the corresponding category, thus, the accuracy of the calculated central vectors can also be improved, and the accuracy of selection to the target users is further improved.

Figure 6:
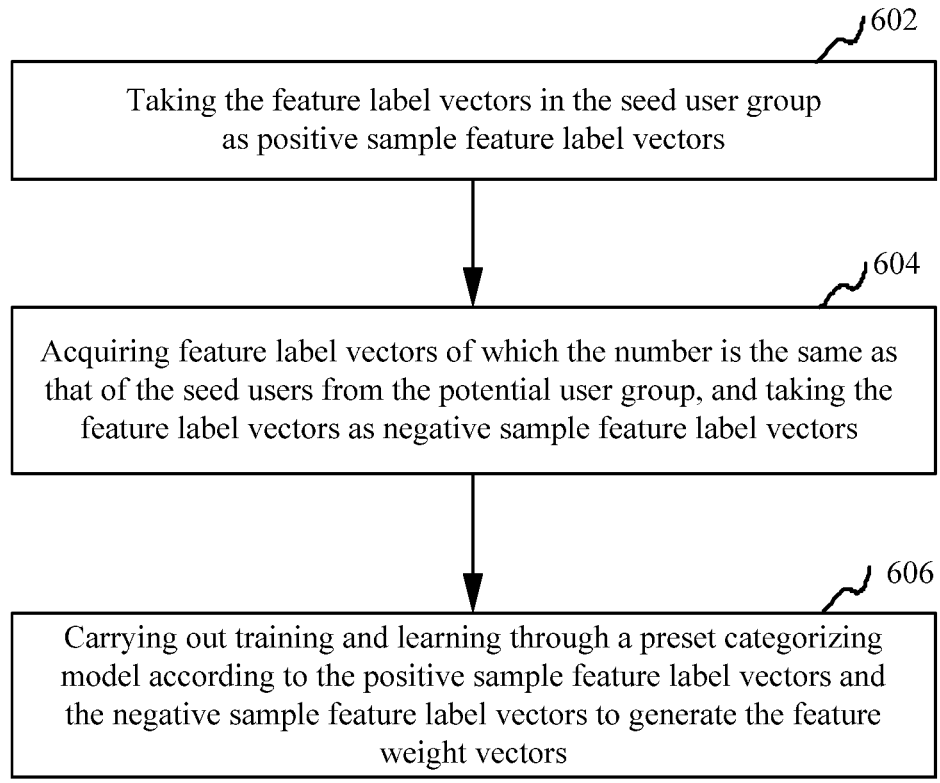
FIG. 6 is a flow diagram of a step of acquiring feature weight vectors corresponding to information of each category in an embodiment.

In an embodiment, as shown in FIG. 6, step 306 includes:

Step 602: take the feature label vectors in the seed user group as positive sample feature label vectors.

In the embodiment, the feature label vectors of all the seed users or part of selected seed users in the seed user group may serve as positive sample feature label vectors, and serve as positive samples to form a positive sample vector set.

Step 604: acquire feature label vectors of which the number is the same as that of the seed users from the potential user group, and take the feature label vectors as negative sample feature label vectors.

The negative sample feature label vectors of which the number equals to that of the positive sample feature label vectors can be selected by a preset random function, and serve as negative samples to form a negative sample vector set.

In an embodiment, the execution sequence of step 602 and step 604 may not be limited.

Step 606: carry out training and learning through a preset categorizing model according to the positive sample feature label vectors and the negative sample feature label vectors to generate feature weight vectors.

In the embodiment, the preset categorizing model can be an arbitrary binary categorizing model, and particularly can be a logistic regression categorizing model. The server may carry out binary categorizing model training on the basis of the positive sample vector set and the negative sample vector set, and then the feature weight vectors under various clusters can be obtained, namely, the feature weight vectors are obtained after the binary categorizing model is trained, and are parameters obtained after the binary categorizing model is trained.

In the embodiment, the accuracy of the acquired feature weight vectors can be improved through the preset model, the accuracy of calculation to the first distances is improved correspondingly, and the accuracy of selection to the target users is also improved.

In an embodiment, step 310 includes: screen the feature label vectors in the potential user group according to a categorizing model; and calculate the first distance from each selected potential user to the central vector of each category.

In the embodiment, the categorizing model is the same as the categorizing model in foregoing step 606, and can be an arbitrary binary categorizing model. The server can input the feature label vectors of the potential users in the potential user group into the categorizing model, and calculates an output result. If the output result is 1, it shows that a certain matching degree exists between the corresponding potential user and push information, and the potential user can be a user for whom the push information can be provided. If the output result is 0, it shows that the corresponding potential user does not match with the push information, and then the potential user can be eliminated, and is not a user for whom the push information is provided, wherein the potential users corresponding to the calculation result which is 1 are the selected potential users. The server can only calculate the first distance from each selected potential user to the central vector of each category on the basis of the feature label vector of the selected potential user, the feature weight vector and the central vector.

In the embodiment, the server may screen the massive amount of stored potential users before the first distances are obtained so as to eliminate part of potential users who are not matched with the push information, calculation of the first distances corresponding to the part of potential users is not required, thus, calculated amount can be reduced, occupation to resources is lowered, and the efficiency of selection to the target users is improved.

In an embodiment, step 312 includes: totally rank the first distances; and select a corresponding number of top ranked potential users from the potential users in the total rank as target users.

In the embodiment, the total rank is mixed rank under the condition that categorizing is not considered, by total ranking, the matching degree between the selected target users from all the potential users and a certain or multiple categories of information which is about to be pushed is the highest, and thus, the accuracy of selection to the target users is improved.

In an embodiment, step 312 includes: separately rank the first distances corresponding to each category; and select a corresponding number of top tanked potential users from the potential users in rank of each category as target users.

In the embodiment, the server can further directly extract the first distances corresponding to the potential users in each category, separate ranking on each category is carried out, and a corresponding number of top ranked potential users are selected from rank in each category as target users.

Further, after calculating the first distance from the corresponding potential user to the central vector of each category, the server can select the shortest first distances from the first distances of the central vectors of the different categories as third distances. A category identifier of category information corresponding to the shortest first distance is set for the potential user. By the category identifier, it can be known that the corresponding potential user is matched with the information of the category the most.

The server can rank the third distances corresponding to all the potential users with the same category identifiers, and a corresponding number of potential users corresponding to the shortest distances are selected from the potential users corresponding to each category identifier as target users for whom information is pushed.

The corresponding number can be configured according to requirements of the information of the different categories. Furthermore, a distance threshold value can further be set correspondingly for information of each category, the potential users corresponding to the third distances smaller than the distance threshold value in the corresponding category are selected, and the selected potential users are target users. The number of the selected target users is a second number.

In the embodiment, the first distances corresponding to each category are ranked separately, a corresponding number of top ranked potential users are selected from rank of each category as target users, and the number of the selected target users can be reasonably configured according to the categories of to-be-pushed information.

In an embodiment, after step 314 is carried out, the following step will be carried out: acquire feedback information of the targeted users; and update the central vector and the feature weight vectors which correspond to the information of each category according to the feedback information.

In the embodiment, the feedback information of the target users includes information about whether the corresponding target users are interested in recommended information or not. After receiving the recommended information of the service provider, the terminals of the target users can transmit feedback information about whether the target users are interested in the recommended information or not, the server can receive the feedback information transmitted from the terminals of the target users, and whether the target users are interested in the recommended information or not can be known according to the feedback information.

Further, the server can detect whether the number of the acquired feedback information of the target users reaches a preset number or not, when the number of the feedback information reaches the preset number, the central vector and the feature weight vectors which correspond to the information of each category are updated according to the feedback information.

The clusters for the target users who send the feedback information can be acquired. If the feedback information shows that the target users are interested in the recommended information, the target users are categorized into the seed user group of the corresponding category, and the corresponding seed center is updated according to the feature label vectors of the corresponding users in the categorized seed user group. If the feedback information shows that the target users are not interested in the recommended information, the feature label vectors of the target users can be categorized into the negative sample vector set, training and learning are carried out through the preset categorizing model according to the positive sample vector set formed by the feature label vectors in the new formed seed user group, and new feature weight vectors are generated. Therefore, updating to the central vectors and the feature weight vectors is implemented, the acquired central vectors and feature weight vectors are more accurate, and the selected target users can be more accurate when the target users are selected again subsequently.

Figure 7:
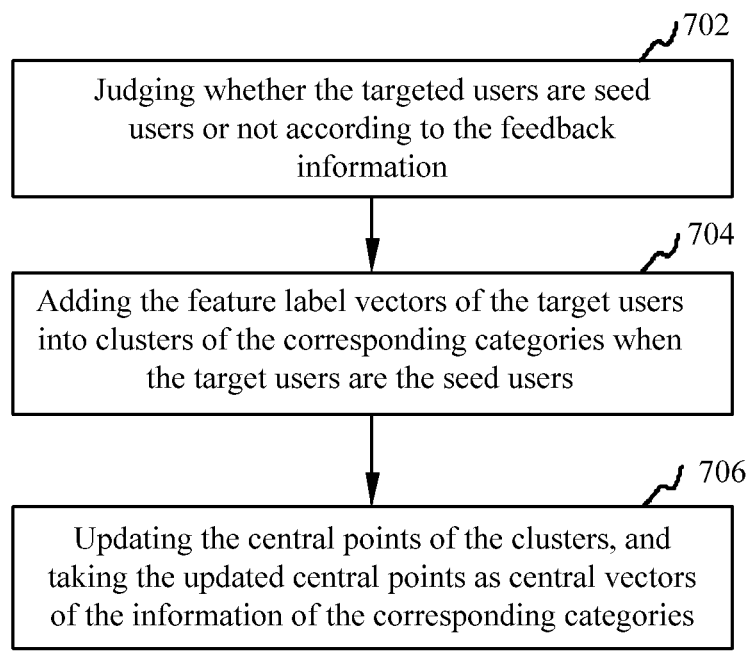
FIG. 7 is a flow diagram of a step of updating the central vector and the feature weight vectors which correspond to information of each category according to feedback information in an embodiment.

In an embodiment, as shown in FIG. 7, a step of updating the central vector and the feature weight vectors which correspond to the information of each category according to the feedback information includes:

Step 702: judge whether the targeted users are seed users or not according to the feedback information.

In the embodiment, when the feedback information shows that the target users are interested in the recommended information, the target users can be seed users, and are categorized into the seed user group; and when the feedback information shows that the target users are not interested in the recommended information, the target users are not categorized into the seed user group.

Step 704: add the feature label vectors of the target users into clusters of the corresponding categories when the target users are the seed users.

For the target users who are the seed users, the categories of the corresponding information can be acquired according to the category identifiers of the target users, the feature label vectors of the target users are added into the clusters of the corresponding categories, and the clusters are formed by the feature label vectors of the seed users provided by the service provider.

Step 706: update the central points of the clusters, and take the updated central points as central vectors of the information of the corresponding categories.

In an embodiment, the corresponding central points can be calculated according to the calculating method in foregoing step 510, and the central points serve as the central vectors of the information of the corresponding categories. By updating the central vectors, the accuracy of the determined central vectors may be higher, and thus, the targeted users selected according to the central vectors are more accurate.

Figure 8:
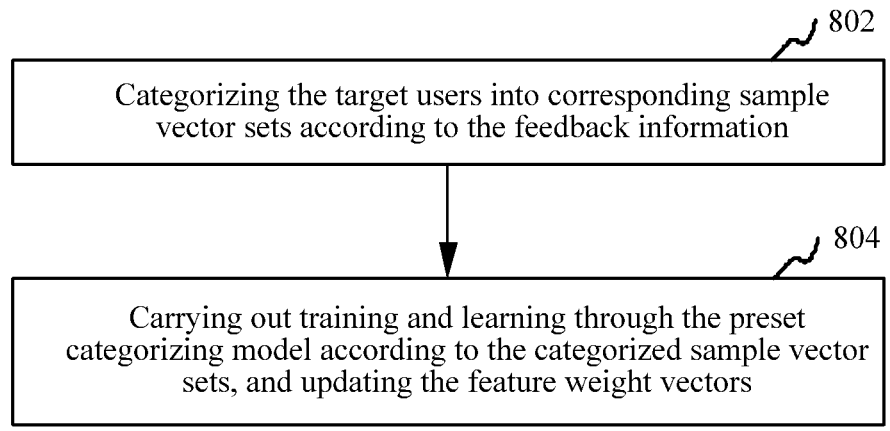
FIG. 8 is a flow diagram of the step of updating the central vector and the feature weight vectors which correspond to the information of each category according to the feedback information in an embodiment.

In an embodiment, as shown in FIG. 8, a step of updating the central vector and the feature weight vectors which correspond to the information of each category according to the feedback information includes:

Step 802: categorize the target users into the corresponding sample vector sets according to the feedback information.

In the embodiment, the server can separately screen out the target users who are interested in the recommended information and the target users who are not interested in the recommended information according to the feedback information, the feature label vectors of the selected target users who are interested in the recommended information serve as positive samples, and are added into the positive sample vector set, and the feature label vectors of the selected target users who are not interested in the recommended information serve as negative samples, and are added into the negative sample vector set.

Whether the number of the samples in the positive sample vector set and the number of the samples in the negative sample vector set are the same or not is detected, and if the number of the samples in the positive sample vector set and the number of the samples in the negative sample vector set are not the same, the samples in the positive sample vector set or the negative sample vector set may be increased or decreased until the number of the positive samples is the same as that of the negative samples.

In an embodiment, when the number of the samples of the negative sample vector set is greater than that of the samples of the positive sample vector set, the extra samples can be decreased from the negative sample vector set, wherein the negative sample feature label vectors acquired from the previous potential user group can be decreased preferentially. When the number of the samples of the negative sample vector set is smaller than that of the samples of the positive sample vector set, the feature label vectors of a certain number of potential users can be continued being selected from the potential user group as negative samples, and the negative samples are added in the negative sample vector set so as to keep the number of the positive samples and the number of negative sample the same.

Step 804: carry out training and learning through the preset categorizing model according to the categorized sample vector sets, and update the feature weight vectors.

The categorizing model is the same as the categorizing model in foregoing step 606, and can be an arbitrary binary categorizing model. The server can carry out binary categorizing model training on the basis of the new positive sample vector set and the new negative sample vector set, the feature weight vectors of various clusters are calculated again, and the recalculated feature weight vectors serve as feature weight vectors of the information of the corresponding categories.

In the embodiment, the corresponding target users are categorized into the positive sample vector set and the negative sample vector set again according to the feedback information, the feature weight vectors are calculated again according to the categorized sample vector sets, thus, the calculated feature weight vectors can reflect the proportion of the corresponding feature labels better, and selection to the target users according to the feature weight vectors is more accurate.

Figure 9:
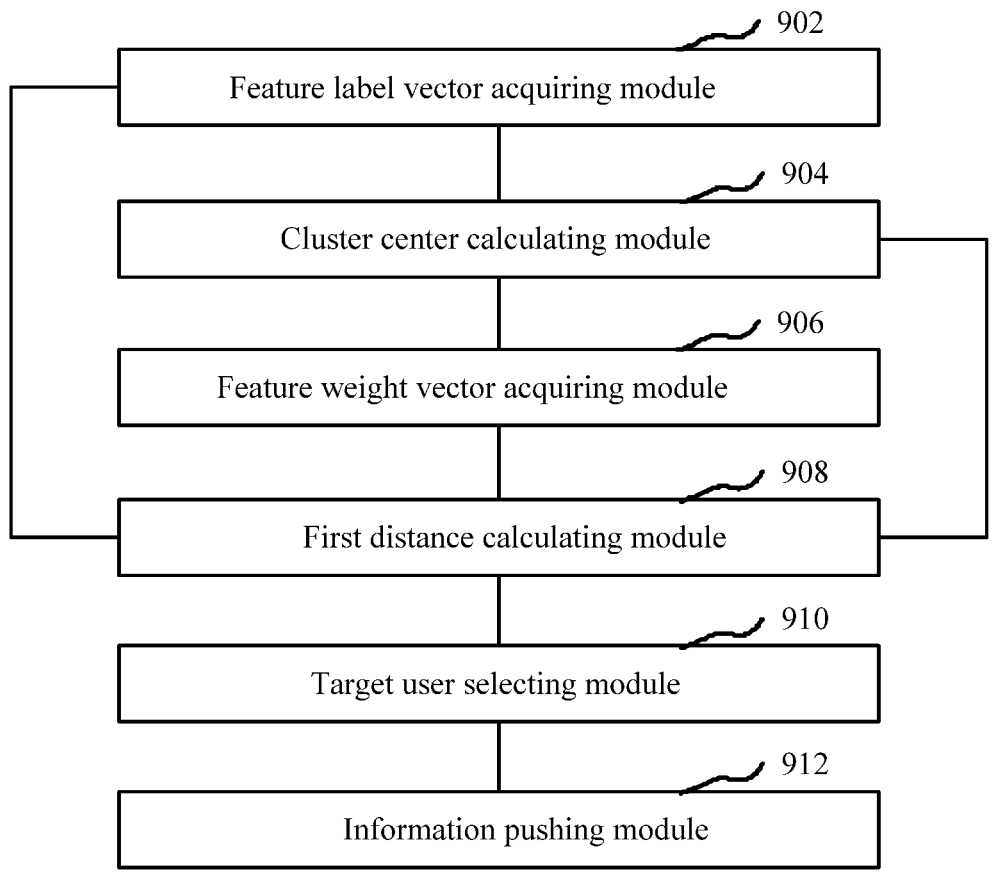
FIG. 9 is a structure diagram of a server in an embodiment.

In an embodiment, as shown in FIG. 9, provided is a server, and the server includes:

a feature label vector acquiring module 902, which is configured to acquire the feature label vector of each seed user;

a central vector calculating module 904, which is configured to form a first number of preset clusters according to the feature label vectors of all the seed users, and calculate the central vectors of the corresponding clusters according to the feature label vectors of the seed users in each cluster;

a feature weight vector acquiring module 906, which is configured to acquire feature weight vectors corresponding to the information of each category;

the feature label vector acquiring module 902 is further configured to acquire the feature label vector of each potential user in a potential user group;

a first distance calculating module 908, which is configured to calculate the first distances from the potential users to the central vector of each category according to the feature label vectors of the potential users, the feature weight vectors and the central vectors;

a target user selecting module 910, which is configured to select a second number of potential users corresponding to the shortest distances from the first distances as target users; and an information pushing module 912, which is configured to transmit push information which is matched with the corresponding categories to the terminals of the target users.

In an embodiment, the central vector calculating module 904 is further configured to determine the categories of the feature label vectors of the corresponding seed users according to category identifiers when the information of the seed users includes the category identifiers so as to form a first number of clusters of categories; and the central vector calculating module 904 is configured to calculate the central point of each cluster, and the central point serves as the central vector of the information of the corresponding category.

In an embodiment, the central vector calculating module 904 is further configured to select a first number of feature label vectors from the seed user group when the information of the seed users does not include the category identifiers, each selected feature label vector serves as the initial central vector of the information of one of the categories, and thus, the information of each category has one initial central vector; the second distance from each feature label vector of the seed user group to the previous central vector of the information of each category is calculated, and the category of the corresponding feature label vector is determined according to the second distance to form a first number of clusters of the categories; the central point of each cluster is calculated; whether the central points of the clusters have been converged or not is judged, if the central points of the clusters have been converged, the central points serve as the central vectors of the information of the corresponding categories; and if the central points of the clusters have not been converged, the central point, which is calculated at present, of each cluster serves as the previous central vector of the information of the corresponding category, and the process returns to calculation of the second distance from each feature label vector of the seed user group to the previous central vector of the information of each category until it determines that the calculated central points of the clusters have been converged.

In an embodiment, the feature label vector acquiring module 902 is further configured to take the feature label vectors in the seed user group as the positive sample feature label vectors, acquire the feature label vectors of which the number is the same as that of the seed users from the potential user group, take the feature label vectors as the negative sample feature label vectors, and carry out training and learning by the preset categorizing model according to the positive sample feature label vectors and the negative sample feature label vectors to generate the feature weight vectors.

In an embodiment, the first distance calculating module 908 is further configured to screen the feature label vectors in the potential user group according to the categorizing model, and calculate the first distance from each selected potential user to the central vector of each category.

In an embodiment, the target user selecting module 910 is further configured to carry out separate ranking on the first distances corresponding to each category, and select a corresponding number of top ranked potential users from the potential users in the rank of each category as target users.

Figure 10:
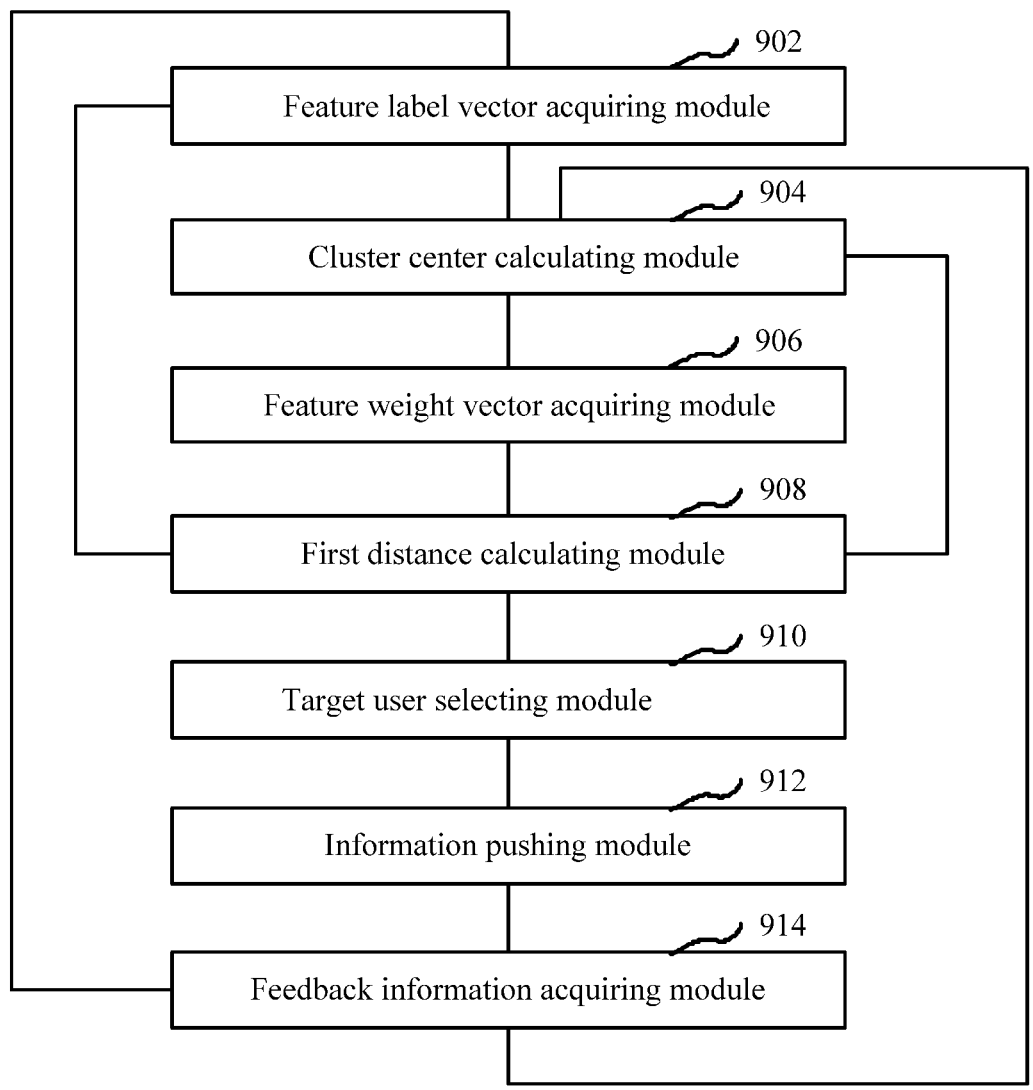
FIG. 10 is a structure diagram of a server in another embodiment.

In an embodiment, as shown in FIG. 10, provided is another server, and the server further includes:

a feedback information acquiring module 914, which is configured to acquire feedback information of target users;

the central vector calculating module 904 which is further configured to update the central vector corresponding to the information of each category according to the feedback information; and the feature weight vector acquiring module 906 which is further configured to update the feature weight vectors corresponding to the information of each category according to the feedback information.

Figure 11:
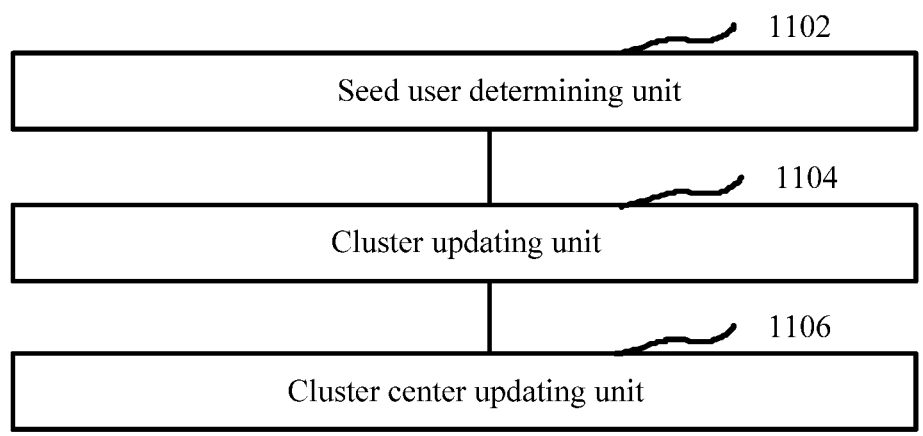
FIG. 11 is a structure diagram of a central vector calculating module in an embodiment.

In an embodiment, as shown in FIG. 11, the central vector calculating module 904 further includes:

a seed user determining unit 1102, which is configured to judge whether the target users are seed users or not according to the feedback information;

a cluster updating unit 1104, which is configured to add the feature label vectors of the target users into the clusters of the corresponding categories when the target users are the seed users; and a central vector updating unit 1206, which is configured to update the central points of the clusters and take the updated central pints as the central vectors of the information of the corresponding categories.

Figure 12:
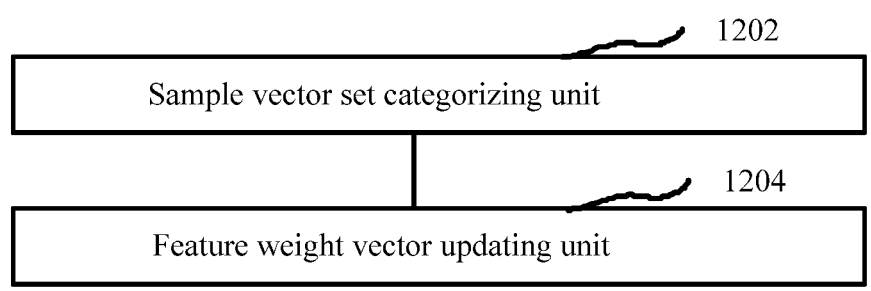
FIG. 12 is a structure diagram of a feature weight vector acquiring module in an embodiment.

In an embodiment, as shown in FIG. 12, the feature weight vector acquiring module 906 further includes:

a sample vector set categorizing unit 1202, which is configured to categorize the target users into the corresponding sample vector sets according to the feedback information; and a feature weight vector updating unit 1204, which is configured to carry out training and learning through the preset model according to the categorized sample vector sets and update the feature weight vectors.

In an embodiment, the information pushing module 912 is further configured to transmit the information of the target users to a client terminal so that the client terminal can push information to the terminals of the target users.

Various modules in the server can be totally or partially implemented through software, hardware or combination of the software and the hardware. The various modules can be embedded in or independent from the processor in the server in a hardware mode, and can also be stored in the memory in the server in a software mode, and thus the processor conveniently calls and executes operations corresponding to the various foregoing modules. The processor may be a central processing unit (CPU), a microprocessor, a singlechip or the like.

A person of ordinary skill in the art may understand that total or part of processes in the method for implementing the foregoing embodiments can be completed by instructing related hardware through a computer program, the program can be stored in a computer readable storage medium, and when being executed, the program can include the processes of the embodiments of the various foregoing methods, wherein the storage medium can be a non-volatile storage medium such as a magnetic disk, an optical disk and a read-only memory (ROM), or a random access memory (RAM) or the like.

Various technical features of the foregoing embodiments can be combined arbitrarily, for simplicity of description, not all possible combinations of the various technical features in the foregoing embodiments are described, however, all the combinations of the various technical features in the foregoing embodiments should be considered to be within the scope of the description if such combinations are not contradictory.

The foregoing embodiments only describe several implementation manners of the present disclosure, the description is specific and detailed, but cannot therefore be understood as a limitation to the patent scope of the present disclosure. It should be noted that a person of ordinary skill in the art may further make variations and improvements without departing from the conception of the present disclosure, and these all fall within the protection scope of the present disclosure. Therefore, the patent protection scope of the present disclosure should be subject to the appended claims.

What is claimed is:

1. A method, comprising:
   at a server having one or more processors and memory:
   acquiring a respective feature label vector of each seed user of a plurality of seed users;
   forming a first preset number of clusters corresponding to the first preset number of user label categories according to the respective feature label vectors of the plurality of seed users;
   calculating a central vector of a corresponding cluster according to the respective feature label vectors of the seed users in each cluster of the first preset number of user label categories;
   acquiring a feature weight vector corresponding to the each cluster of the first preset number of user label categories, wherein weight coefficients in the feature weight vector indicate correlations between a cluster of seed users corresponding to the label category and different categories of information to be pushed to the corresponding cluster of seed users;
   acquiring a respective feature label vector of each potential user in a user group;
   calculating respective first distances from the respective feature label vector of each potential user in the user group to the respective central vectors of the first preset number of user label categories;
   multiplying the respective first distances from the respective feature label vector of each potential user in the user group to the respective central vectors of the first preset number of user label categories according to the feature weight vectors;
   selecting a second number of potential users corresponding to the shortest first distances from the first distances as target users; and
   transmitting, to terminals of the target users, push information which is matched with corresponding user label categories of the target users.

2. The method according to claim 1, wherein:
   forming the first preset number of clusters corresponding to the first preset number of user label categories according to the respective feature label vectors of the plurality of seed users includes determining categories of the feature label vectors of the corresponding seed users according to category identifiers, wherein information of the seed users includes the category identifiers; and calculating the central vector of a corresponding cluster according to the respective feature label vectors of the seed users in each cluster of the first preset number of user label categories includes calculating a respective central point of each cluster, and taking the respective central point as the central vector of the corresponding user label category.

3. The method according to claim 1, wherein forming the first preset number of clusters corresponding to the first preset number of user label categories according to the respective feature label vectors of the plurality of seed users includes:

selecting the first number of feature label vectors from a seed user group when the information of the seed users does not include the category identifiers;

taking each selected feature label vector as an initial central vector of a respective one of the user label categories so that each user label category has one initial central vector;

calculating a second distance from each feature label vector of the seed user group to the previous central vector of each user label category; and determining the user label category of the corresponding feature label vector according to the second distance so as to form the first preset number of clusters of the user label categories; and calculating the central vector of a corresponding cluster according to the respective feature label vectors of the seed users in each cluster of the first preset number of user label categories includes:

calculating a central point of each cluster;

judging whether the central points of the clusters have been converged or not; and taking the central points as central vectors of the corresponding user label categories in accordance with a determination that the central points of the clusters have been converged; and taking the central point, which is calculated at present, of each cluster as the previous central vector of the corresponding user label category in accordance with a determination that the central points of the clusters have not been converged, and returning to calculation of the second distance from each feature label vector of the seed user group to the previous central vector of the information of each category until it is determined that the calculated central points of the clusters have been converged.

4. The method according to claim 1, wherein acquiring the respective feature label vector of each potential user in the potential user group includes:

taking the feature label vectors in the seed user group as positive sample feature label vectors;

acquiring the feature label vectors of a number of potential users whose number is the same as that of the seed users from a potential user group as negative sample feature label vectors; and carrying out training and learning through a preset categorizing model according to the positive sample feature label vectors and the negative sample feature label vectors to generate the feature weight vectors.

5. The method according to claim 1, wherein calculating the respective first distances from the respective feature label vector of each potential user to the respective central vectors of the first preset number of user label categories includes:

screening the feature label vectors in the potential user group according to a categorizing model; and calculating the first distance from each selected potential user to the central vector of each user label category.

6. The method according to claim 1, wherein selecting the second number of potential users corresponding to the shortest first distances from the first distances as the target users includes:

separately ranking the first distances corresponding each user label category; and selecting a corresponding number of top ranked potential users from the potential users in the rank of each user label category as target users.

7. The method according to claim 1, wherein transmitting push information which is matched with corresponding user label categories of the target users to the terminals of the target users by the server includes:

acquiring feedback information of the target users; and updating the central vectors and feature weight vectors which correspond to each user label category according to the feedback information.

8. A server, comprising:

one or more processors; and memory; and a plurality of instructions stored in the memory, wherein the instructions, when executed by the one or more processors, cause the one or more processors to perform operations including:

acquiring a respective feature label vector of each seed user of a plurality of seed users;

forming a first preset number of clusters corresponding to the first preset number of user label categories according to the respective feature label vectors of the plurality of seed users;

calculating a central vector of a corresponding cluster according to the respective feature label vectors of the seed users in each cluster of the first preset number of user label categories;

acquiring a feature weight vector corresponding to the each cluster of the first preset number of user label categories, wherein weight coefficients in the feature weight vector indicate correlations between a cluster of seed users corresponding to the label category and different categories of information to be pushed to the corresponding cluster of seed users;

acquiring a respective feature label vector of each potential user in a potential user group;

calculating respective first distances from the respective feature label vector of each potential user in the user group to the respective central vectors of the first preset number of user label categories;

multiplying the respective first distances from the respective feature label vector of each potential user in the user group to the respective central vectors of the first preset number of user label categories according to the feature weight vectors;

selecting a second number of potential users corresponding to the shortest first distances from the first distances as target users; and transmitting, to terminals of the target users, push information which is matched with corresponding user label categories of the target users.

9. The server according to claim 8, wherein:
forming the first preset number of clusters corresponding to the first preset number of user label categories according to the respective feature label vectors of the plurality of seed users includes determining categories of the feature label vectors of the corresponding seed users according to category identifiers, wherein information of the seed users includes the category identifiers; and
calculating the central vector of a corresponding cluster according to the respective feature label vectors of the seed users in each cluster of the first preset number of user label categories includes calculating a respective central point of each cluster, and taking the respective central point as the central vector of the corresponding user label category.

10. The server according to claim 8, wherein forming the first preset number of clusters corresponding to the first preset number of user label categories according to the respective feature label vectors of the plurality of seed users includes:
selecting the first number of feature label vectors from a seed user group when the information of the seed users does not include the category identifiers;
taking each selected feature label vector as an initial central vector of a respective one of the user label categories so that each user label category has one initial central vector;
calculating a second distance from each feature label vector of the seed user group to the previous central vector of each user label category; and
determining the user label category of the corresponding feature label vector according to the second distance so as to form the first preset number of clusters of the user label categories; and
calculating the central vector of a corresponding cluster according to the respective feature label vectors of the seed users in each cluster of the first preset number of user label categories includes:
calculating a central point of each cluster;
judging whether the central points of the clusters have been converged or not; and
taking the central points as central vectors of the corresponding user label categories in accordance with a determination that the central points of the clusters have been converged; and
taking the central point, which is calculated at present, of each cluster as the previous central vector of the corresponding user label category in accordance with a determination that the central points of the clusters have not been converged, and returning to calculation of the second distance from each feature label vector of the seed user group to the previous central vector of the information of each category until it is determined that the calculated central points of the clusters have been converged.

11. The server according to claim 8, wherein acquiring the respective feature label vector of each potential user in the potential user group includes:
taking the feature label vectors in the seed user group as positive sample feature label vectors;
acquiring the feature label vectors of a number of potential users whose number is the same as that of the seed users from a potential user group as negative sample feature label vectors; and
carrying out training and learning through a preset categorizing model according to the positive sample feature label vectors and the negative sample feature label vectors to generate the feature weight vectors.

12. The server according to claim 8, wherein calculating the respective first distances from the respective feature label vector of each potential user to the respective central vectors of the first preset number of user label categories includes:
screening the feature label vectors in the potential user group according to a categorizing model; and
calculating the first distance from each selected potential user to the central vector of each user label category.

13. The server according to claim 8, wherein selecting the second number of potential users corresponding to the shortest first distances from the first distances as the target users includes:
separately ranking the first distances corresponding each user label category; and
selecting a corresponding number of top ranked potential users from the potential users in the rank of each user label category as target users.

14. The server according to claim 8, wherein transmitting push information which is matched with corresponding user label categories of the target users to the terminals of the target users by the server includes:
acquiring feedback information of the target users; and
updating the central vectors and feature weight vectors which correspond to each user label category according to the feedback information.

15. A non-transitory computer-readable storage medium storing a plurality of instructions configured for execution by a server having one or more processors, wherein the plurality of instructions, when executed by the server, cause the server to perform operations comprising:
acquiring a respective feature label vector of each seed user of a plurality of seed users;
forming a first preset number of clusters corresponding to the first preset number of user label categories according to the respective feature label vectors of the plurality of seed users;
calculating a central vector of a corresponding cluster according to the respective feature label vectors of the seed users in each cluster of the first preset number of user label categories;
acquiring a feature weight vector corresponding to the each cluster of the first preset number of user label categories, wherein weight coefficients in the feature weight vector indicate correlations between a cluster of seed users corresponding to the label category and different categories of to be pushed to the corresponding cluster of seed users;
acquiring a respective feature label vector of each potential user in a potential user group;
calculating respective first distances from the respective feature label vector of each potential user in the user group to the respective central vectors of the first preset number of user label categories;
multiplying the respective first distances from the respective feature label vector of each potential user in the user group to the respective central vectors of the first preset number of user label categories according to the feature weight vectors;
selecting a second number of potential users corresponding to the shortest first distances from the first distances as target users; and
transmitting, to terminals of the target users, push information which is matched with corresponding user label categories of the target users.

16. The non-transitory computer-readable storage medium of claim 15, wherein:
  forming the first preset number of clusters corresponding to the first preset number of user label categories according to the respective feature label vectors of the plurality of seed users includes determining categories of the feature label vectors of the corresponding seed users according to category identifiers, wherein information of the seed users includes the category identifiers; and
  calculating the central vector of a corresponding cluster according to the respective feature label vectors of the seed users in each cluster of the first preset number of user label categories includes calculating a respective central point of each cluster, and taking the respective central point as the central vector of the corresponding user label category.

17. The non-transitory computer-readable storage medium of claim 15, wherein forming the first preset number of clusters corresponding to the first preset number of user label categories according to the respective feature label vectors of the plurality of seed users includes:
  selecting the first number of feature label vectors from a seed user group when the information of the seed users does not include the category identifiers;
  taking each selected feature label vector as an initial central vector of a respective one of the user label categories so that each user label category has one initial central vector;
  calculating a second distance from each feature label vector of the seed user group to the previous central vector of each user label category; and
  determining the user label category of the corresponding feature label vector according to the second distance so as to form the first preset number of clusters of the user label categories; and
  calculating the central vector of a corresponding cluster according to the respective feature label vectors of the seed users in each cluster of the first preset number of user label categories includes:
    calculating a central point of each cluster;
    judging whether the central points of the clusters have been converged or not; and
    taking the central points as central vectors of the corresponding user label categories in accordance with a determination that the central points of the clusters have been converged; and
    taking the central point, which is calculated at present, of each cluster as the previous central vector of the corresponding user label category in accordance with a determination that the central points of the clusters have not been converged, and returning to calculation of the second distance from each feature label vector of the seed user group to the previous central vector of the information of each category until it is determined that the calculated central points of the clusters have been converged.

18. The non-transitory computer-readable storage medium of claim 15, wherein acquiring the respective feature label vector of each potential user in the potential user group includes:
  taking the feature label vectors in the seed user group as positive sample feature label vectors;
  acquiring the feature label vectors of a number of potential users whose number is the same as that of the seed users from a potential user group as negative sample feature label vectors; and
  carrying out training and learning through a preset categorizing model according to the positive sample feature label vectors and the negative sample feature label vectors to generate the feature weight vectors.

19. The non-transitory computer-readable storage medium of claim 15, wherein calculating the respective first distances from the respective feature label vector of each potential user to the respective central vectors of the first preset number of user label categories categories includes:
  screening the feature label vectors in the potential user group according to a categorizing model; and
  calculating the first distance from each selected potential user to the central vector of each user label category.

20. The non-transitory computer-readable storage medium of claim 15, wherein selecting the second number of potential users corresponding to the shortest first distances from the first distances as the target users includes:
  separately ranking the first distances corresponding each user label category; and
  selecting a corresponding number of top ranked potential users from the potential users in the rank of each user label category as target users.

* * * * *